(12) United States Patent
Wang

(10) Patent No.: US 7,716,195 B2
(45) Date of Patent: May 11, 2010

(54) SEARCH METHODS

(75) Inventor: John C. Wang, Taoyuan (TW)

(73) Assignee: HTC Corporation, Taoyuan County, Taoyuan (TW)

( * ) Notice: Subject to any disclaimer, the term of this patent is extended or adjusted under 35 U.S.C. 154(b) by 116 days.

(21) Appl. No.: 11/285,074

(22) Filed: Nov. 23, 2005

(65) Prior Publication Data

US 2006/0136397 A1  Jun. 22, 2006

(30) Foreign Application Priority Data

Dec. 21, 2004  (TW) .............................. 93139827 A

(51) Int. Cl.
*G06F 7/00* (2006.01)

(52) U.S. Cl. .................... 707/705; 379/93.23; 715/776; 715/780; 715/864; 707/758

(58) Field of Classification Search ............. 379/93.23; 715/776, 780, 864
See application file for complete search history.

(56) References Cited

U.S. PATENT DOCUMENTS

| | | | |
|---|---|---|---|
| 4,858,106 A * | 8/1989 | Mattheyses ................. 707/101 |
| 5,111,398 A * | 5/1992 | Nunberg et al. ................. 704/9 |
| 5,329,598 A * | 7/1994 | Geist ........................... 382/228 |
| 5,708,804 A | 1/1998 | Goodwin et al. |
| 5,778,370 A * | 7/1998 | Emerson ..................... 707/100 |
| 5,787,411 A * | 7/1998 | Groff et al. ..................... 707/2 |
| 5,909,666 A * | 6/1999 | Gould et al. ................. 704/251 |
| 5,966,126 A * | 10/1999 | Szabo ........................ 715/835 |
| 6,370,518 B1 * | 4/2002 | Payne et al. ..................... 707/1 |
| 6,609,128 B1 * | 8/2003 | Underwood ................. 707/10 |
| 7,007,239 B1 * | 2/2006 | Hawkins et al. ................. 707/3 |
| 2002/0161752 A1 * | 10/2002 | Hutchison ...................... 707/3 |
| 2002/0181466 A1 * | 12/2002 | Neustein et al. ............. 370/393 |
| 2004/0093317 A1 * | 5/2004 | Swan ............................. 707/1 |
| 2005/0193338 A1 * | 9/2005 | Hawkins et al. ............. 715/700 |
| 2006/0288298 A1 * | 12/2006 | Haitani et al. ............... 715/739 |

OTHER PUBLICATIONS

Handspring, "TREO 270 Communicator User Guide", Mar. 2002, Handspring, Inc., Windows Edition, pp. 1-255.*

* cited by examiner

*Primary Examiner*—Vincent Boccio
(74) *Attorney, Agent, or Firm*—Birch, Stewart, Kolasch & Birch, LLP

(57) ABSTRACT

Search methods. A string is first received. The string is divided to generate at least one string fragment set, comprising of at least a first and a second fragments. A record conforming to the string fragment set is searched for and retrieved. A first data block of the record may include or begin with the first fragment, and a second block may include or begin with the second fragment. The first block may include or begin with the second fragment, and the second block may include or begin with the first fragment.

16 Claims, 6 Drawing Sheets

```
JOHAN ABERSTON
JOHNNY APPLESEEDS
JOHAN BACK
JOHN BENSON
JOHNNY BUSH
JOHN DEER
JOHN JONES
JOHNATHAN MANN
JOHNNY ROCKET
JOHNSON SHER
JOHN WANG
```
— 500

FIG. 5A

```
JOHNNY APPLESEEDS
JOHN BENSON
JOHNNY BUSH
JOHN DEER
JOHN JONES
JOHNATHAN MANN
JOHNNY ROCKET
JOHNSON SHER
JOHN WANG
```
— 500

FIG. 5B

SEARCH METHODS

BACKGROUND OF THE INVENTION

1. Field of the Invention

The present invention relates to search methods, and, more particularly, to search methods based on string fragments.

2. Brief Discussion of the Related Art

Devices such as computer systems and portable devices provide an address book function for managing address records. Most address books provide an easy-to-use single field interface for the quick entry of search strings, allowing address records to be retrieved accordingly. While simple and convenient, search results using this conventional method are often inconclusive. For example, entering a common first name such as "JOHN," could yield numerous address records beginning with "JOHN."

As described previously, all portable devices, such as mobile phones, PDA phones, and smart phones, have address book functions. Since portable devices are limited in size, the search procedure is particularly inconvenient. For example, scrolling up and down to locate a correct address record requires more effort than on a personal computer.

To improve search result accuracy, the conventional address book search method provides first and last name search string fields. This method, however, makes the user interface too complicated for most applications, particularly in mobile phones.

SUMMARY OF THE INVENTION

Search methods are provided in the present invention. In the exemplary embodiment of this search method, a string is first received. The string is divided to generate at least one string fragment set, comprising of at least a first and a second fragment. At least a record conforming to the string fragment set is searched for and retrieved. A first data block of the record may include or begin with the first fragment, and a second block may include or begin with the second fragment. The first block may include or begin with the second fragment, and the second block may include or begin with the first fragment.

The string is divided according to any position in the string to generate two fragments. For example, if the string is "ABC", and the string is divided according to any position in the string, three string fragment sets are generated. The string fragment sets are " " (empty) and "ABC", "A" and "BC", and "AB" and "C", respectively. Furthermore, the data blocks can be in different data fields, such as first name, last name, and company name fields, or in the same data filed with a division symbol for separating the data blocks.

The string can be further divided so that the first or second fragment comprises the entire string.

The first and second data blocks can be in different data fields or in the same data field.

If the string comprises a division symbol such as a blank space, a comma, or a slash, the string is divided according to the position of the division symbol.

In this exemplary embodiment, a keystroke set is received, and the keystroke corresponds to a plurality of letters. The keystroke set is divided to generate at least one keystroke fragment set, comprising of at least a first and a second fragment. A record conforming to the keystroke fragment set is searched and retrieved. A first block may include or begin with a first letter combination corresponding to the keystrokes in the first fragment, and a second block may include or begin with a second letter combination corresponding to the keystrokes in the second fragment. The first block may include or begin with the second letter combination corresponding to the keystrokes in the second fragment, and the second block may include or begin with a first letter combination corresponding to the keystrokes in the first fragment.

The keystroke set can be further divided so that the first or the second fragment comprises the entire keystroke set.

The first and second data blocks can be in different data fields or in the same data field.

The keystroke set is divided according to the position of a division symbol if the keystroke set comprises of the division symbol.

Search methods may take the form of program code embodied in a tangible medium. When the program code is loaded and executed by a machine, the instrument becomes an apparatus for practicing the disclosed method.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustrated only, and thus are not limitative of the present invention, and wherein:—

FIGS. 5A to 5C show search examples.

DETAILED DESCRIPTION OF THE PREFERRED EMBODIMENTS

Search methods are provided in the presented invention.

Figure 1:
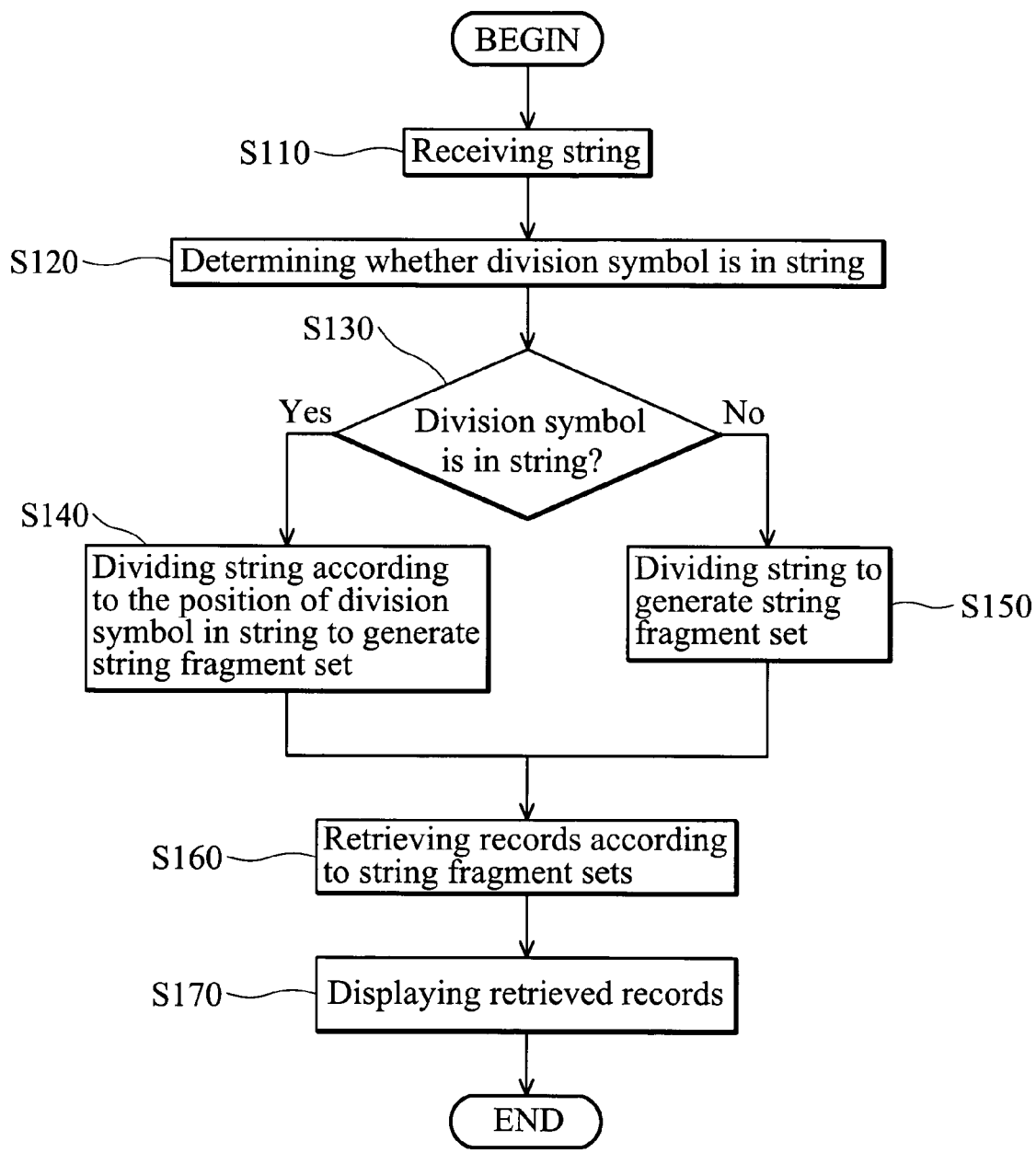
FIG. 1 is a flowchart of an embodiment of a search method.

FIG. 1 is a flowchart of an embodiment of a search method. The search method is suitable for use in computer systems and also in portable devices such as laptops, mobile phones, PDAs, and smart phones.

In step S110, a string is received. In step S120, it is determined whether a predefined division symbol, such as a blank space, a comma, or a slash is in the string. If so (Yes in step S130), in step S140, the string is divided according to the position of the division symbol in the string to generate a string fragment set. The string fragment set comprises at least a first and a second fragments.

For example, if the input string is "AB/C", the first fragment is "AB", and the second fragment is "C", or the first fragment is "C", and the second fragment is "AB". It is understood that if the division symbol is at beginning or end of the string, such as "/ABC" or "ABC/", either the first or second fragment contains the entire string, and the other fragment is empty.

If not (No in step S130), in step S150, the string is divided according to predetermined partitions to generate string fragment sets. In this embodiment, the predetermined partitions divide the string at any position. For example, the string fragment sets are "A/BC", "AB/C", and "ABC" (/ABC or ABC/) if the input string is "ABC". It is noted that the string fragment set "A/BC" includes two fragments—"A" and "BC", the string fragment set "AB/C" includes two fragments—"AB" and "C", and the string fragment set "ABC" includes two fragments—"ABC" and " " (empty).

In step S160, a record conforming to any of the string fragment sets is searched for and retrieved. A first data block of the record may include or begin with the first fragment of a specific string fragment set, and a second block may include or begin with the second fragment of the string fragment set. Additionally, the first block may include or begin with the second fragment of a specific string fragment set, and the second block may include or begin with the first fragment of the string fragment set. It is understood that the first and second blocks may include different data fields, such as first name, last name, and company name fields. Furthermore, the first and second data blocks may be in the same data field, where the first and second data blocks are separated by a division symbol, such as a blank space.

For example, in the "A/BC" string fragment, the record conforming to the string fragment set "A/BC" may be the first data block including or beginning with "A" and the second data block including or beginning with "BC", or the first data block including or beginning with "BC" and the second data block including or beginning with "A."

In step S170, the retrieved records are shown. It is understood that a selection of the record, such as a selection of an address record, can be received. When the selection is received, detailed information of the selected record can be displayed, or a number corresponding to the selected record can be dialed.

As mentioned previously, the conformation determination can follow two procedures. If "begin" is used in practice and the input string is "ABC", the general retrieval syntax for all string fragment sets is "ABC*", "*dABC*", "A*dBC*", "*dA*dBC*", "BC*dA*", "*dBC*dA*", "AB*dC*", "*dAB*dC*", "C*dAB*", and "*dC*dAB*", where "*" represents zero to multiple arbitrary symbols, "d" represents the division symbol. If "include" is used in practice and the input string is "ABC", the general retrieval syntax for all string fragment sets is "*ABC*", "A*d*BC*", "*BC*d*A*", "*AB*d*C*", and "*C*d*AB*."

A common characteristic of address book searching involves predictive letter entry. For example, phone button "2" can mean either "2", "a", "b" or "c." In another embodiment, a search method for predictive keystrokes is provided. A keystroke set is first received, and the keystroke corresponds to a plurality of letters or symbols. The keystroke set is divided to generate at least one keystroke fragment set. The keystroke fragment set comprises of a first and a second fragments. A record conforming to the keystroke fragment set is searched for and retrieved. A first data block of the record may include or begin with a first letter combination corresponding to the keystrokes in the first fragment, and a second block may include or begin with a second letter combination corresponding to the keystrokes in the second fragment. The first block may include or begin with the second letter combination corresponding to the keystrokes in the second fragment, and the second block may include or begin with first letter combination corresponding to the keystrokes in the first fragment.

Figure 4:
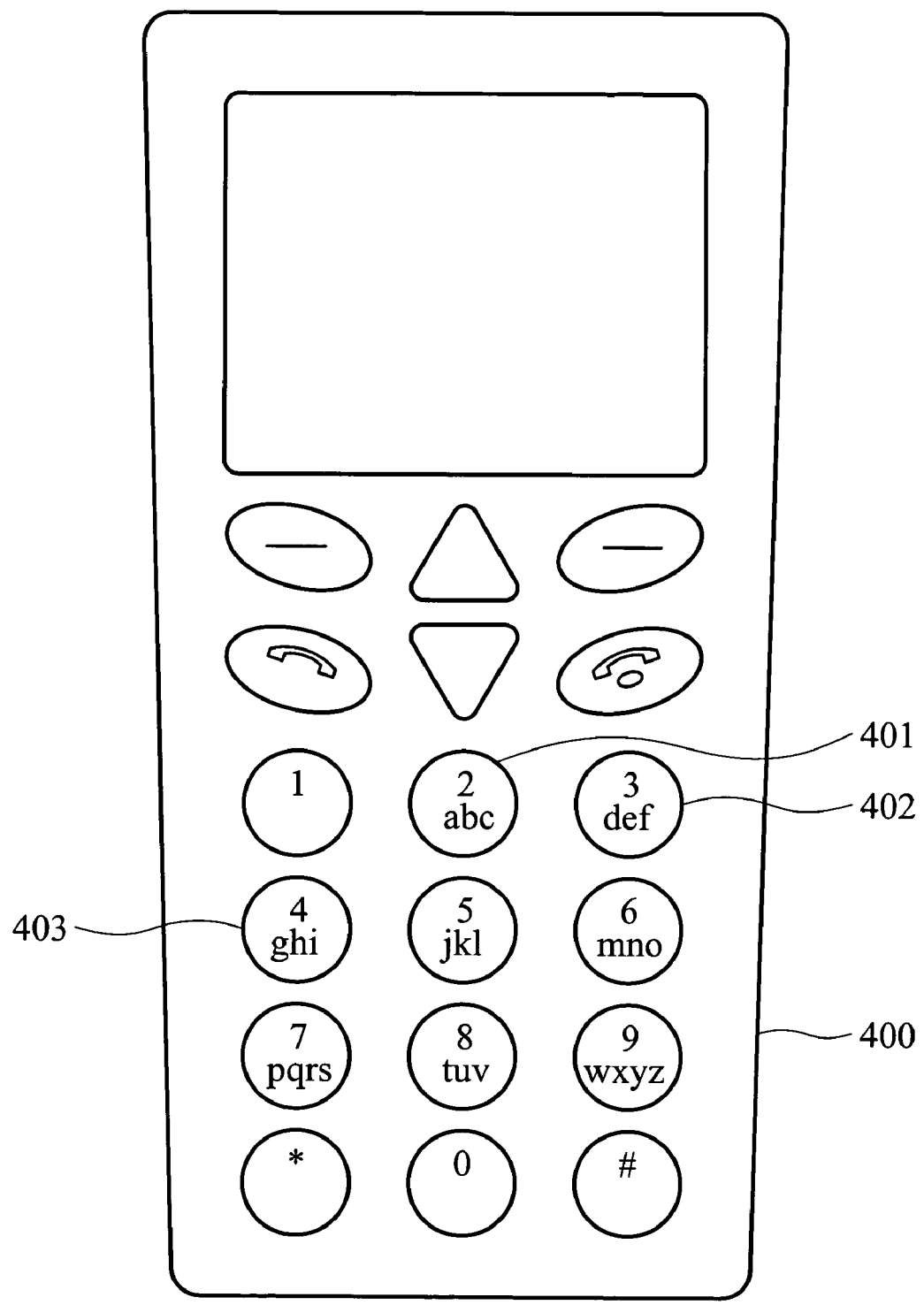
FIG. 4 is a schematic diagram illustrating a keypad of a mobile phone.

The input keystroke set is "ABC", where the letter or symbol corresponding to the keystroke "A" comprises "A1" "A2", "A3" and "A4", the letter or symbol corresponding to the keystroke "B" comprises "B1", "B2", "B3" and "B4", and the letter or symbol corresponding to the keystroke "C" comprises "C1", "C2", "C3" and "C4." For example, FIG. 4 is a schematic diagram illustrating keypad 400 in a mobile phone. When keys 401, 402, and 403 corresponding to keystrokes "A", "B" and "C" are pressed, the letter or symbol corresponding to the keystroke "A" comprises "2", "a", "b" and "c", the letter or symbol corresponding to the keystroke "B" comprises "3", "d", "e" and "f", and the letter or symbol corresponding to the keystroke "C" comprises "4", "g", "h" and "i". When "begin" is used, the general retrieval syntax for all string fragment sets of the keystrokes "ABC" is:

"(A1|A2|A3|A4)(B1|B2|B3|B4)(C1|C2|C3|C4)*",
"*d(A1|A2|A3|A4)(B1|B2|B3|B4)(C1|C2|C3|C4)*",
"(A1|A2|A3|A4)*d(B1|B2|B3|B4)(C1|C2|C3|C4)*",
"*d(A1|A2|A3|A4)*d(B1|B2|B3|B4)(C1|C2|C3|C4)*",
"(B1|B2|B3|B4)(C1|C2|C3|C4)*d(A1|A2|A3|A4)*",
"*d(B1|B2|B3|B4)(C1|C2|C3|C4)*d(A1|A2|A3|A4)*",
"(A1|A2|A3|A4)(B1|B2|B3|B4)*d(C1|C2|C3|C4)*",
"*d(A1|A2|A3|A4)(B1|B2|B3|B4)*d(C1|C2|C3|C4)*",
"(C1|C2|C3|C4)*d(A1|A2|A3|A4)(B1|B2|B3|B4)*", and
"*d(C1|C2|C3|C4)*d(A1|A2|A3|A4)(B1|B2|B3|B4)*."

Figure 5C:
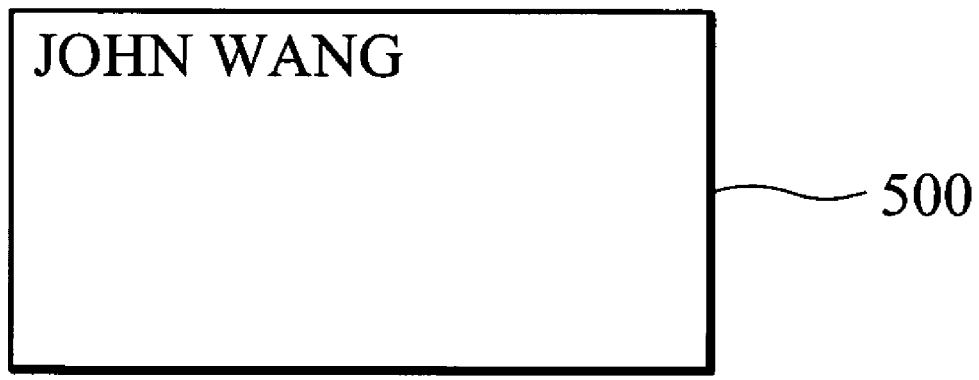

When "include" is used, the general retrieval syntax for all string fragment sets of the keystroke "ABC" is:
"*(A1|A2|A3|A4)(B1|B2|B3|B4)(C1|C2|C3|C4)*",
"*(A1|A2|A3|A4)*d*(B1|B2|B3|B4)(C1|C2|C3|C4)",
"*(B1|B2|B3|B4)(C1|C2|C3|C4)*d*(A1|A2|A3|A4)*",
"*(A1|A2|A3|A4)(B1|B2|B3|B4)*d*(C1|C2|C3|C4)*", and "*(C1|C2|C3|C4)*d*(A1|A2|A3|A4)(B1|B2|B3|B4)*", For example, if a user wants to search for a record named "JOHN WANG" and the input string is "JOH", the divided string fragment sets are "J/OH", "JO/H" and "JOH", and 11 records are retrieved according to the string fragment sets, as shown in the block 500 of FIG. 5A, where the line represents a record, and a name is composed by several data blocks separated by a blank space. When the user continues to input letter "N", the string becomes "JOHN", the string fragment sets are "J/OHN", "JO/HN", "JOH/N" and "JOHN", and nine records are retrieved according to the string fragment sets, as shown in the block 500 of FIG. 5B. Then, the letter "W" is inputted, and the string becomes "JOHNW". Conventionally, no record can be matched and retrieved since no string "JOHNW" is at the beginning of any data block. In this embodiment, the string fragment sets are "J/OHNW", "JO/HNW", "JOH/NW", "JOHN/W" and "JOHNW", and the record of "JOHN WANG" can be retrieved according to the string fragment set "JOHN/W", as shown in the block 500 of FIG. 5C.

It is understood that in the described embodiments, the strings are divided into two fragments and compared with two data blocks accordingly. In some embodiments, the string can be divided into several fragments and compared with several data blocks accordingly. For example, when three fragments are divided, the matched record comprises three data blocks, and the respective data blocks include or begin with one of the fragments.

Figure 2:
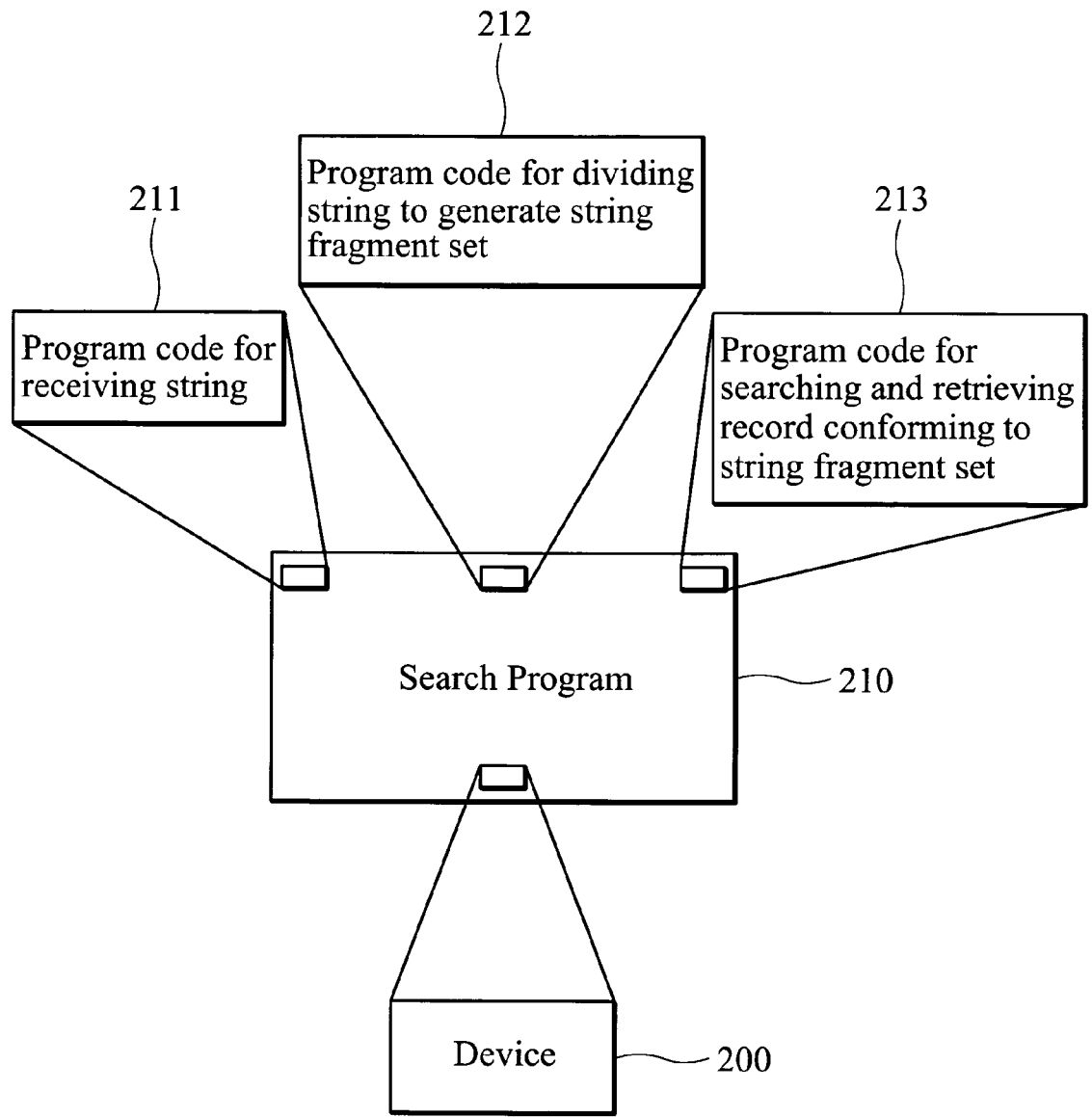
FIG. 2 is a schematic diagram illustrating an embodiment of a storage medium with a computer program for search method execution.

FIG. 2 is a schematic diagram illustrating an embodiment of a storage medium with a computer program for search method execution. The computer program product comprises a storage medium 210 storing a computer readable program code for use in device 200. The computer readable program code includes computer readable program code 211 receiving a string, computer readable program code 212 dividing the string to generate at least one string fragment set, comprising at least a first fragment and a second fragment, and computer readable program code 213 searching for and retrieving a record conforming to the string fragment set. A first data block of the record may include or begin with the first fragment, and a second block may include or begin with the second fragment. The first block may include or begin with the second fragment, and the second block may include or begin with the first fragment.

Figure 3:
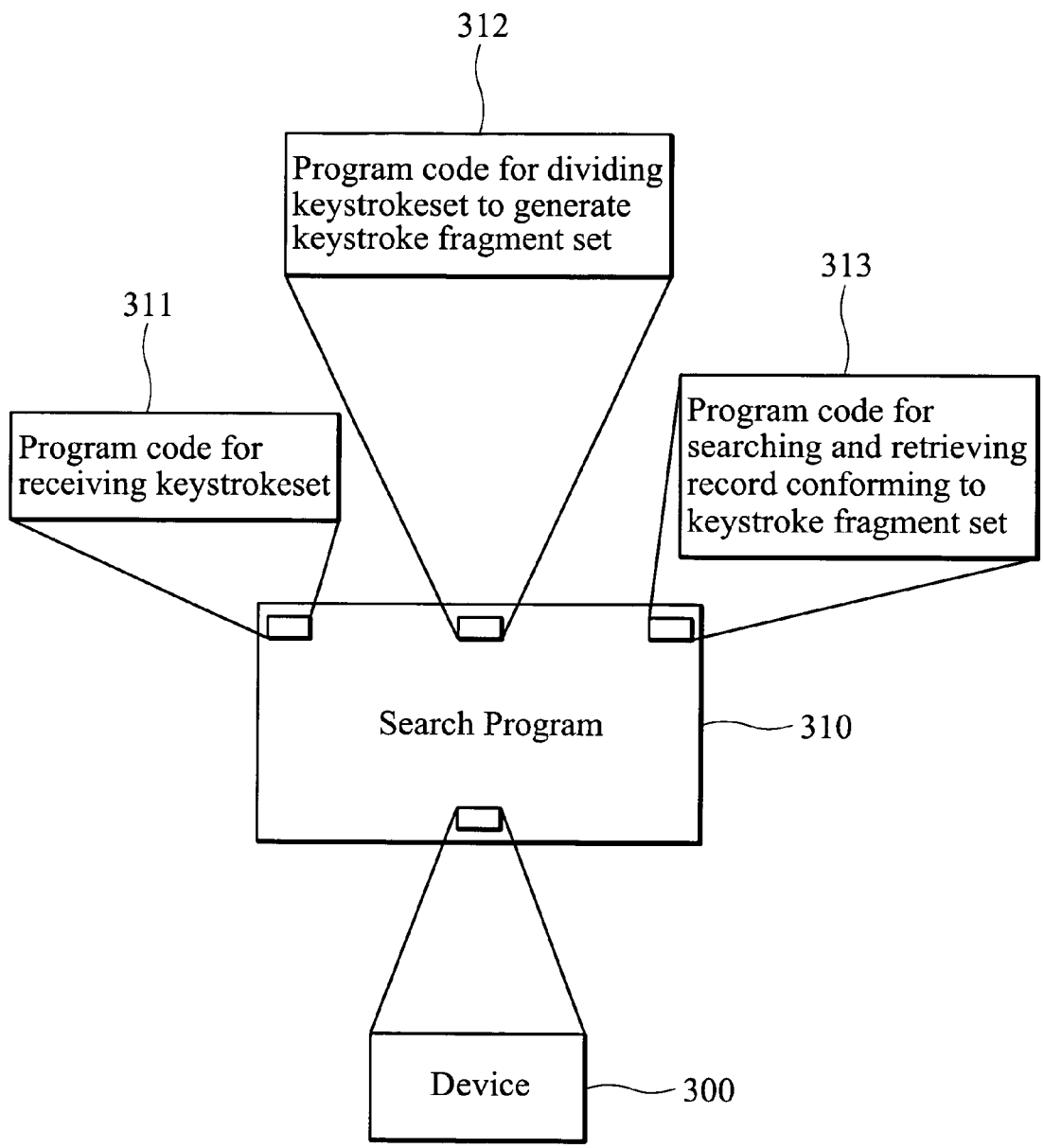
FIG. 3 is a second schematic diagram illustrating an embodiment of a storage medium with a computer program for search method execution.

FIG. 3 is a second schematic diagram illustrating an embodiment of a storage medium with a computer program for search method execution. The computer program product includes storage medium 310 storing computer readable program code for use in device 300. The computer readable program code comprises computer readable program code 311 receiving a keystroke set, the keystroke corresponding to a plurality of letters, computer readable program code 312 dividing the keystroke set to generate at least one keystroke fragment set, comprising of at least a first fragment and a second fragment, and computer readable program codes 313 searching and retrieving a record conforming to the keystroke fragment set. A first data block of the record may include or begin with a first letter combination corresponding to the keystrokes in the first fragment, and a second block may include or begin with a second letter combination corresponding to the keystrokes in the second fragment. The first data block of the record may include or begin with the second letter combination corresponding to the keystrokes in the second fragment, and the second block may include or begin with first letter combination corresponding to the keystrokes in the first fragment.

It is understood that since most string fragment sets are unintended, the corresponding search result may be a null set. For example, if the string is "JOHNWA", and the string fragment set is "J/OHNWA", there are probably many first name fields that include the letter "J", but there is probably no record where the first name field includes "J" and, at the same time, the last name field includes "OHNWA." Additionally, the user does not even need to finish typing "JOHN" before typing "W." One could just type "JOHW." The string "JOHW" can be analyzed and divided into the string fragment set "JOH/W" which filters out the record of "JOHN WANG." Similarly, the string "JWAN" can be used for searching the record of "JOHN WANG." Further, the initials of a person, such as "JW" can be used for searching the record of "JOHN WANG."

Search methods, or certain aspects or portions thereof, may take the form of program code (i.e., executable instructions) embodied in tangible media, such as products, floppy diskettes, CD-ROMS, hard drives, or any other machine-readable storage medium. When the program code is loaded into and executed by a machine such as a computer or a mobile phone, the instrument becomes an apparatus for practicing the methods. The techniques may also be embodied in the form of program code put out over some transmission medium, such as electrical wiring or cabling, through fiber optics, or via any other form, wherein, when the program code is received and loaded into and executed by a machine, such as a computer or a mobile phone device, the instrument becomes an apparatus for practicing the disclosed methods. When implemented on a general-purpose processor, the program code combines with the processor to provide a unique apparatus that operates analogously to application-specific logic circuits.

While the invention has been described by way of example and in terms of a preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A search method, comprising:

receiving a string;

when there is no division symbol in the string, dividing the string to generate at least one string fragment set having at least a first and a second fragment, wherein the string is divided at all positions within the string when the string has at least three letters;

searching and retrieving at least a first record conforming to the string fragment set, in which a first data block of the first record includes the first fragment, wherein the first fragment matches any portion of content from the second character to the last character of the first data block, and a second data block of the first record includes the second fragment, wherein the second fragment matches any portion of content from the second character to the last character of the second data block; and searching and retrieving at least a second record conforming to the string fragment set, in which a first data block of the second record includes the second fragment, wherein the second fragment matches any portion of content from the second character to the last character of the first data block, and a second data block of the second record includes the first fragment, wherein the first fragment matches any portion of content from the second character to the last character of the second data block.

2. The method of claim 1 further comprising dividing the string, so that the first or second fragment includes the entire string.

3. The method of claim 1 wherein the first and second data blocks are in different data fields or in the same data field.

4. The method of claim 1 further comprising dividing the string, according to the position of a division symbol, if the string includes the division symbol.

5. A search method, comprising:

receiving a keystroke set, the keystroke corresponding to a plurality of letters;

when there is no division symbol in the keystroke set, dividing the keystroke set to generate at least one keystroke fragment set having at least a first and a second fragment, wherein the keystroke set is divided at all positions within the keystroke set when the keystroke set has at least three letters;

searching and retrieving at least a first record conforming to the keystroke fragment set, in which a first data block of the first record includes a first letter combination corresponding to the keystrokes in the first fragment, wherein the first letter combination matches any portion of content from the second letter to the last letter of the first data blocks and a second data block of the first record includes a second letter combination corresponding to the keystrokes in the second fragment, wherein the second letter combination matches any portion of content from the second letter to the last letter of the second data block; and searching and retrieving at least a second record conforming to the keystroke fragment set, in which a first data block of the second record includes the second letter combination corresponding to the keystrokes in the second fragment, wherein the second letter combination matches any portion of content from the second letter to the last letter of the first data block, and a second data block of the second record includes the first letter combination corresponding to the keystrokes in the first fragment, wherein the first letter combination matches any portion of content from the second letter to the last letter of the second data block.

6. The method of claim 5 further comprising dividing the keystroke set so that the first or second fragment includes the entire keystroke set.

7. The method of claim 5 wherein the first and second data blocks are in different data fields or in the same data field.

8. The method of claim 5 further comprising dividing the keystroke set, according to the position of a division symbol, if the keystroke set includes the division symbol.

9. A machine-readable storage medium having a computer program, which causes a device to perform a search method during operation, the method comprising:
   receiving a string;
   when there is no division symbol in the string, dividing the string to generate at least one string fragment set, having at least a first and a second fragment, wherein the string is divided at all positions within the string when the string has at least three letters;
   searching and retrieving at least a first record conforming to the string fragment set, in which a first data block of the first record includes the first fragment, wherein the first fragment matches any portion of content from the second character to the last character of the first data block, and a second data block of the first record includes the second fragment, wherein the second fragment matches any portion of content from the second character to the last character of the second data block; and
   searching and retrieving at least a second record conforming to the string fragment set, in which a first data block of the second record includes the second fragment, wherein the second fragment matches any portion of content from the second character to the last character of the first data block, and a second data block of the second record includes the first fragment, wherein the first fragment matches any portion of content from the second character to the last character of the second data block.

10. The storage medium of claim 9 wherein the method further comprises dividing the string, so that the first or the second fragment includes the entire string.

11. The storage medium of claim 9 wherein the first and second data blocks are in different data fields or in the same data field.

12. The storage medium of claim 9 wherein the method further comprises dividing the string, according to the position of a division symbol, if the string includes the division symbol.

13. A machine-readable storage medium comprising a computer program, which causes a device to perform a search method during operation, the method comprising:
   receiving a keystroke set, the keystroke corresponding to a plurality of letters;
   when there is no division symbol in the keystroke set, dividing the keystroke set to generate at least one keystroke fragment set having at least a first and a second fragment, wherein the keystroke set is divided at all positions within the keystroke set when the keystroke set has at least three letters;
   searching and retrieving at least a first record conforming to the keystroke fragment set, in which a first data block of the first record includes a first letter combination corresponding to the keystrokes in the first fragment, wherein the first letter combination matches any portion of content from the second letter to the last letter of the first data block, and a second data block of the first record includes a second letter combination corresponding to the keystrokes in the second fragment, wherein the second letter combination matches any portion of content from the second letter to the last letter of the second data block; and
   searching and retrieving at least a second record conforming to the keystroke fragment set, in which a first data block of the second record includes the second letter combination corresponding to the keystrokes in the second fragment, wherein the second letter combination matches any portion of content from the second letter to the last letter of the first data block, and a second data block of the second record includes the first letter combination corresponding to the keystrokes in the first fragment, wherein the first letter combination matches any portion of content from the second letter to the last letter of the second data block.

14. The storage medium of claim 13 wherein the method further comprises dividing the keystroke set, so that the first or the second fragment includes the entire keystroke set.

15. The storage medium of claim 13 wherein the first and second data blocks are in different data fields or in the same data field.

16. The storage medium of claim 13 wherein the method further comprises dividing the keystroke set according to the position of a division symbol if the keystroke set includes the division symbol.

* * * * *